J. A. ARMSTRONG.
VARIABLE SPEED GEARING.
APPLICATION FILED JULY 28, 1911.

1,039,879.

Patented Oct. 1, 1912.

3 SHEETS—SHEET 1.

Witnesses

Inventor
John Arthur Armstrong

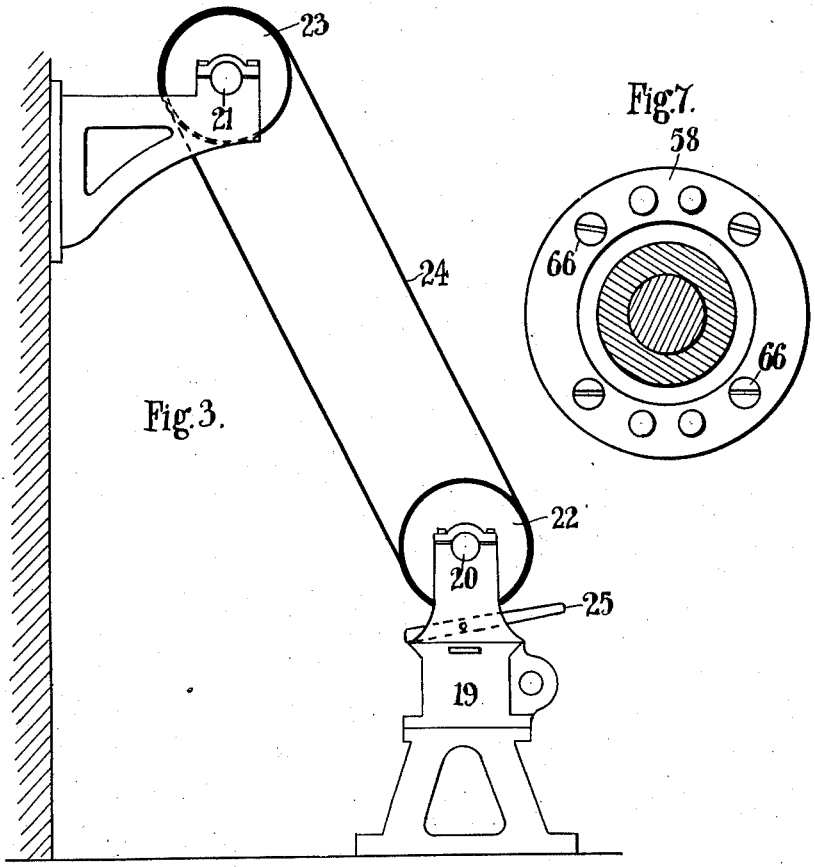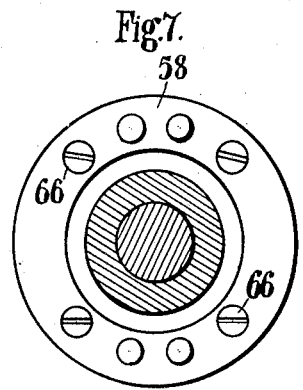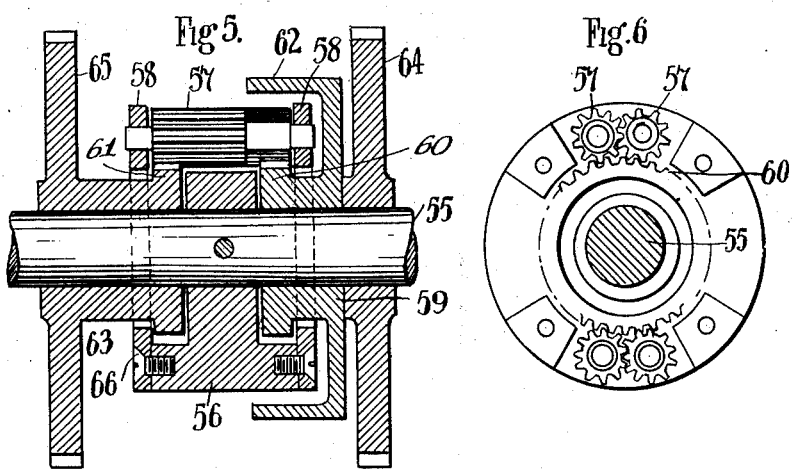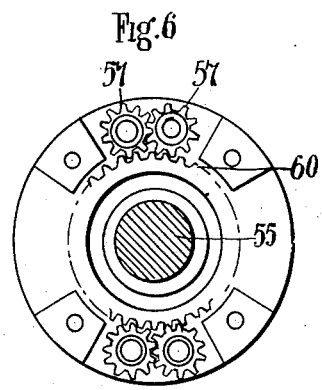

J. A. ARMSTRONG.
VARIABLE SPEED GEARING.
APPLICATION FILED JULY 28, 1911.

1,039,879.

Patented Oct. 1, 1912.
3 SHEETS—SHEET 3.

UNITED STATES PATENT OFFICE.

JOHN ARTHUR ARMSTRONG, OF GILNOCKIE, WESTCOMBE PARK, ENGLAND.

VARIABLE-SPEED GEARING.

1,039,879.　　Specification of Letters Patent.　Patented Oct. 1, 1912.

Application filed July 28, 1911.　Serial No. 641,115.

*To all whom it may concern:*

Be it known that I, JOHN ARTHUR ARMSTRONG, a subject of the King of Great Britain, residing at Gilnockie, Westcombe Park, in the county of Kent, England, have invented new and useful Improvements in Variable-Speed Gearing, of which the following is a specification.

This invention relates to variable speed power transmission mechanism in which the changes of speed are secured by the aid of balance gears all the gear wheels remaining permanently in mesh. According to the invention the central members of the balance gears are keyed to the driving and driven shafts, which arrangement simplifies the gearing and the necessary braking mechanism.

Figure 1:
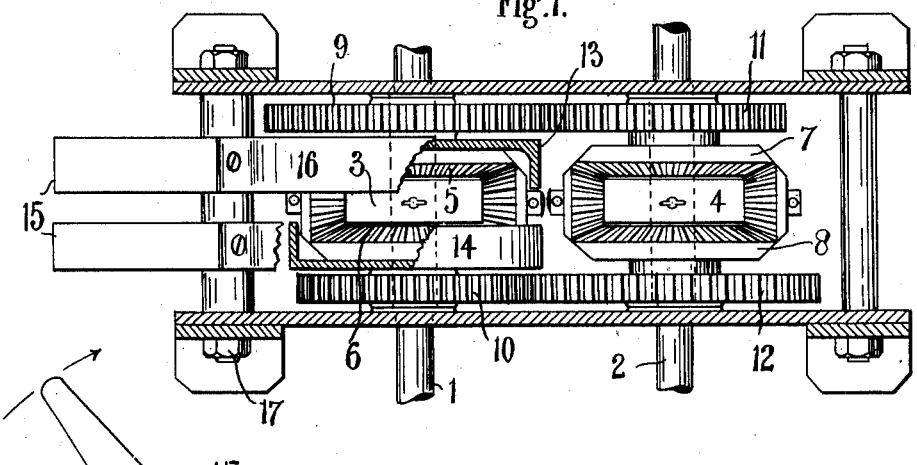
Figure 2:
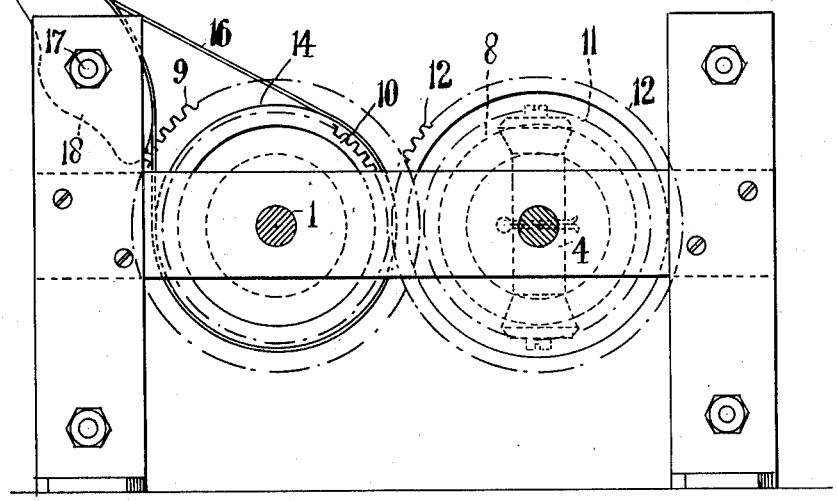
Figure 4:
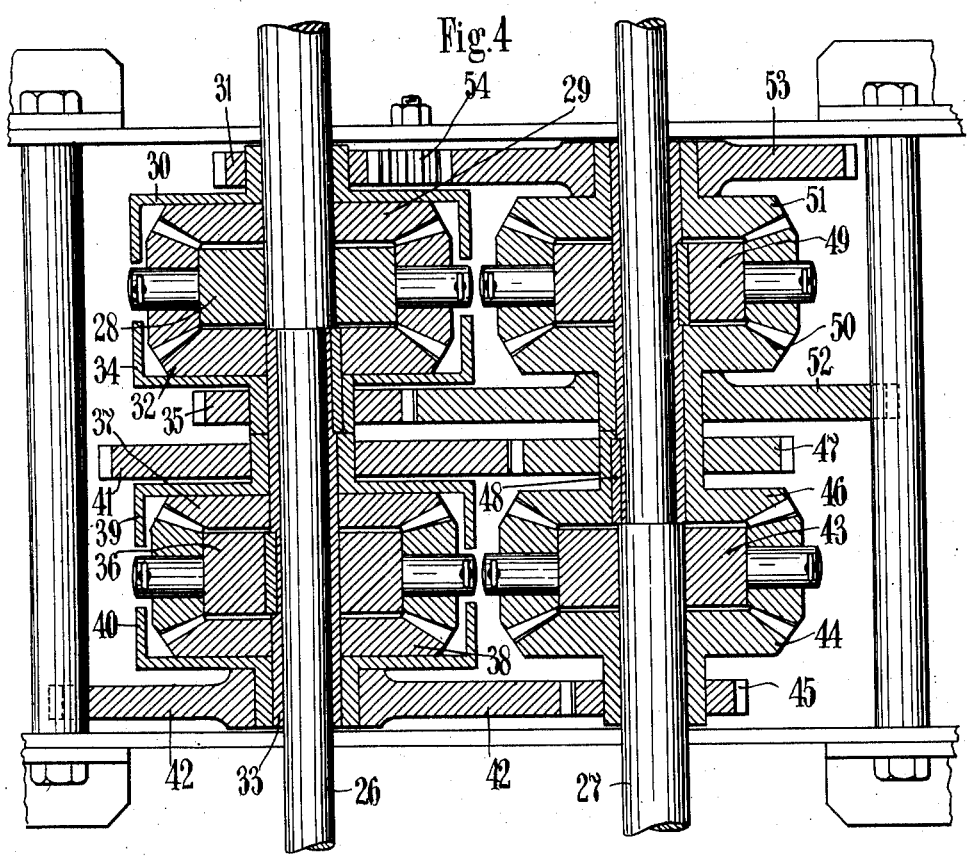

In the accompanying drawings—Figure 1 shows a simple construction according to the invention in plan, and Fig. 2 the same in elevation. Fig. 3 illustrates the application of the invention to mill work. Fig. 4 is a plan of a more complex gearing of the same type; Fig. 5 is a plan, and Figs. 6 and 7 detail views of another simple form of the gearing in which a different kind of balance gear is adopted.

In the constructions shown in Figs. 1, 2 and 4, the invention is illustrated as carried out by the use of differential or balance gears made up of mitre or bevel wheels as in the differential gearing now common upon motor cars.

In the simple construction shown in Figs. 1 and 2, 1 is the driving shaft and 2 the driven shaft to be interconnected by the transmission mechanism. This is comprised of two balance gears one arranged about each shaft. The central member or jack 3, 4 of each gear is connected to the shaft. The side members 5, 6, 7 and 8 are attached to or formed upon spur wheels 9, 10, 11, 12 and are loose upon their respective shafts. Further the two side members of the gear upon one shaft say the driving shaft 1 have attached to them or formed upon them drums 13, 14 respectively which serve for the application of the brake or clutch by which these side members may be held stationary.

A type of brake suitable for certain purposes is clearly seen in Fig. 2. It comprises a pivoted lever 15 to which are attached the two ends of a brake band 16. Beyond its pivot 17 the lever 15 has a cam shaped part 18, the surface of which can bear against one end of the band 16. It will be seen from the figure that if the lever 15 is pressed downward tension is applied directly to one end of the band and indirectly through the cam surface to the other end. However, any other form of brake may be substituted. As may be seen from the figure the spur wheels 9, 11 and 10, 12 intermesh with each other. It is, however, possible to insert a third idle gear wheel between either pair of spur wheels.

As is well known if one side member of a differential or balance gear such as 3, 5, 6 is held stationary the other side member must rotate at twice the speed of the central member or jack; or more generally the speed of the central member is half the sum of the speeds of the side members taking account of sign. With this premise the operation of the gear will be readily understood. If neither of the brake levers 15 is depressed the driving shaft cannot drive the driven shaft from the shaft 1 to the shaft 2. If now one of these levers is depressed so as to hold stationary say the drum 13, then the central member 3 rotating with the shaft 1 will cause the side member 6 to rotate at double its speed. The gear wheel 10 will transmit this rotation through gear wheel 12 to the side member 8 of the second gear, the speed of course changing in accordance with the gear ratio between the wheels 10 and 12 and also changing in direction. Because the wheel 9 is stationary the wheel 11 must be stationary also. Therefore the central member 4 of the second gear and with it the shaft 2 will be rotated at half the speed of the side member 8. This indicates how the gear ratio between the two shafts may be calculated. If instead the other brake lever is depressed so as to hold stationary the member 14, the drive will be from shaft 1, through central member 3 and side member 5 of the first gear, spur wheels 9 and 11, and then through the side member 7 to the central member 4 of the second gear and so to the shaft 2, the side member 8 being held stationary because its spur wheel 12 interlocks with the stationary spur wheel 10. If both brakes are depressed together the driving shaft is braked. If the idle gear is interposed between either pair of spur wheels it will, as above noted, cause the two spur wheels to rotate in the same direction.

The gearing shown in Figs. 1 and 2, though in part these illustrations are diagrammatic, is rather adapted for such purposes as the speed gearing of a motor car. If the invention is applied to mill work the arrangement will generally be rather that indicated in Fig. 3. There 19 is, say, a lathe, the spindle 20 of which corresponds with the driven shaft 2 of Fig. 1.

21 is the driving shaft. Each of these shafts carries a differential gear, the side members of which are attached to pulleys 22, 23. There will be in all four pulleys connected as indicated by two belts 24 or the like. The brake levers 25 are in this case most conveniently applied to the gear upon the driven shaft, but it will be obvious that either alternative is possible. As the gear has a loose or free position and can give forward or reverse speeds and can be braked it may be used as a substitute for the usual fast and loose pulleys or as a clutch for cone or step speed pulleys, for slow motion, for machine feed etc. and generally in mill work.

In the more complex structure shown in Fig. 4, the driving shaft 26 and driven shaft 27 each carry two balance gears. One of each pair is keyed to the shaft it surrounds while the other is loose. Upon the driving shaft 26 there is keyed the central member 28. One side member 29 of this gear carries the drum 30 and the spur wheel 31. The other side member 32 is on a sleeve 33 which rotates loosely on a reduced portion of the shaft 26, and has secured to it the drum 34 and spur wheel 35. There is also keyed to the sleeve 33 the central member 36 of the remaining balance gear. The side members 37, 38 of this balance gearing have drums 39, 40 and spur wheels 41, 42.

The arrangement is the same on the driven shaft 27 except that the gear on this shaft which has its central member keyed to the shaft is opposite the gear on the driving shaft 26, which has its central member keyed to the sleeve, i. e., loose on the shaft.

It is the central member 43 which is thus keyed to shaft 27. One side member 44 bears the spur wheel 45 meshing with spur wheel 42. The other side member 46 has the spur wheel 47 meshing with spur wheel 41 and is keyed upon a sleeve 48 which rotates loosely on a reduced portion of the shaft 27. There is also keyed on this sleeve 48 the central member 49 of the remaining balance gear, the side members 50 and 51 of which carry spur wheels 52 and 53 meshing respectively with the spur wheels 35 and 54. This last named spur wheel is an additional spur wheel such as was above suggested in connection with Figs. 1 and 2, and engages with both the spur wheels 53 and 31 so that these latter rotate in the same direction. It is not, however, essential to introduce this idle wheel in order to obtain a reverse in this type of gear. As before brake levers are provided, indicated in dotted lines by which either of the drums 30, 34, 39 or 40 may be held stationary at will.

A single example will serve to indicate how varying speed ratios are obtained from this gearing. If the drum 30 is held stationary then the member 32 must rotate at double the speed of member 28, i. e. at double the speed of the driving shaft 26. As a consequence the central member 36 rotates at this double speed and this determines the sum of the speeds of the spur wheels 41 and 42. Now upon the driven shaft the spur wheel 53 and therefore the side member 51 is stationary. Spur wheel 52 and therefore side member 50 are driven by spur wheel 35. Therefore central member 49 will be rotating and that at half the speed of the side member 50. The side member 46 of the second gear is therefore rotating at this same speed and this determines the speed of the spur wheel 41. Hence the speed of spur wheel 42 is determined and therefore that of spur wheel 45 and of side member 44. Now central member 43 must rotate at half the sum of the speeds of the members 44 and 46 and so its speed and hence that of the shaft 27 are determined. From this example it will be clear that the depression of any one of the brake levers fixes the speed ratio between the driving and driven shafts. If none of the levers is depressed there will be no driving connection between the shafts. If two of the levers are depressed there will be a braking action. The braking action can be made gentle or severe by choosing brakes which operate on drums which would otherwise be rotated at a low or a high speed as may be desired. By a consideration of the property of balance gears above alluded to, it is possible to form equations relating to the speeds of the driving and driven shafts for any of the conditions in which the gearing may be worked; i. e. any speeds or combinations of forward or reverse drive, and it is possible also to obtain a converse series of equations which give in terms of the desired speed ratios between the shafts, the necessary gear ratios between the intermeshing members. Thus any desired series of speeds which may be in the same or opposite directions may be selected and gear wheels devised to produce them.

It will be obvious that a greater number of balance gears can be employed if desired and a correspondingly greater number of speeds obtained. It will also be clear that the invention may be put in practice with the aid of other types of balance gearing. An example of such construction is shown in Figs. 5 to 7. In this construction, 55 is the driving shaft which carries a central member 56. The form of this member is further shown in Fig. 6. It carries long pinions 57 which are kept in place by rings 58 secured by screws 66 shown in detail in Fig. 7. As may be seen from that figure, the pinions 57 are in pairs, the two of each pair meshing with each other along a portion of their length, i. e. when they overlap at the center of the member 56. Around the shaft 55 are loose members 59 and 63 to which are secured two spur wheels 60 and 61 respectively. Each of these meshes with one of the pinions 57 of each pair. A brake drum 62 may be provided upon one or both of the members 59 and 63. There may also be gear wheels or belt pulleys 64, 65. It will be seen then that this is a gear exactly resembling in its properties one of the balance gears described in reference say to Fig. 1. If a similar gear is provided upon the driven shaft, its gear wheels meshing with the gear wheels 64, and 65, the two shafts will be interconnected in such a manner that either of two speed ratios can be obtained, or a free engine position or a brake position.

What I claim is:—

1. In a speed gearing, the combination of a driving shaft, a member keyed thereto, bevel pinions mounted rotatably at each end of said member, bevel wheels loose on said shaft gearing with said bevel pinions, a driven shaft, a member keyed to said shaft, bevel pinions mounted rotatably at the ends of said member, bevel wheels loose on said driven shaft, and gearing with said pinions, and gearing interconnecting the bevel wheels on the driving and driven shafts and brakes operating upon the bevel wheels on said shafts.

2. In a speed gearing, the combination of a driving shaft, a member keyed thereto, bevel pinions mounted rotatably at each end of said member, bevel wheels loose on said shaft gearing with said bevel pinions, a driven shaft, a member keyed to said shaft, bevel pinions mounted rotatably at the ends of said member, bevel wheels loose on said driven shaft and gearing with said pinions, gearing interconnecting the bevel wheels on the driving and driven shafts, and a brake operating upon one of the bevel wheels on said shafts.

3. In a speed gearing the combination of a casing, two shafts journaled in said casing, two beveled wheels mounted loosely upon each of said shafts, a member connected to each of said shafts between said two bevel wheels, bevel pinions rotatably mounted at the ends of said members, gearing with said two bevel wheels, and gearing connecting bevel wheels on said two shafts, and a brake operating upon one of the bevel wheels on said shafts.

4. In a speed gearing, the combination of a driving shaft, a member keyed thereto, bevel pinions mounted rotatably at each end of said member, bevel wheels loose on said shaft gearing with said bevel pinions, a driven shaft, a member keyed to said shaft, bevel pinions mounted rotatably at the ends of said member, bevel wheels loose on said driven shaft, and gearing with said pinions, gearing interconnecting the bevel wheels on the driving and driven shafts, a brake drum fixed on and incasing one of the bevel wheels on said shafts, and a brake band inclosing and operating upon said brake drum.

5. In a speed gearing, the combination of a driving shaft, a member keyed thereto, bevel pinions mounted rotatably at each end of said member, bevel wheels loose on said shaft gearing with said bevel shaft, a driven shaft, a member keyed to said shaft, bevel pinions mounted rotatably at the ends of said member, bevel wheels loose on said driven shaft and gearing with said pinions, gearing interconnecting the bevel wheels on the driving and driven shafts, a brake drum fixed on and incasing one of the bevel wheels on said shafts, a brake band inclosing and operating upon said brake drum and a brake lever pivoted in said casing and having both ends of said brake band attached thereto, and having a tail piece adapted to engage with and tighten said brake band upon depression of said brake lever.

6. In a speed gearing the combination of a driving shaft, a member keyed thereto, bevel pinions mounted rotatably at each end of said member, bevel wheels loose on said shaft gearing with said bevel pinions, a driven shaft, a member keyed to said shaft, bevel pinions mounted rotatably at the ends of said member, bevel wheels loose on said driven shaft and gearing with said pinions, a spur wheel fixed upon one of said bevel wheels on the driving shaft, a spur wheel gearing with said spur wheel and fixed to one of the bevel wheels on the driven shaft, spur gearing interconnecting the other bevel wheels on the driving and driven shafts, and braking means operating upon one of the bevel wheels on said shafts.

7. In a speed gearing the combination of a driving shaft, a member keyed thereto, bevel pinions mounted rotatably at each end of said member, bevel wheels loose on said shaft gearing with said bevel pinions, a driven shaft, a member keyed to said shaft, bevel pinions mounted rotatably at the ends of said member, bevel wheels loose on said driven shaft and gearing with said pinions, a spur wheel fixed upon one of said bevel wheels on the driving shaft, a second spur wheel upon the driving shaft and fixed to the second bevel wheel on the driving shaft, a second spur wheel on the driven shaft fixed to the second bevel wheel on the driven shaft and gearing with said second spur wheel on the driving shaft, and brakes operating upon the bevel wheels on the said shafts.

8. In a speed gearing, the combination of a casing, a driving shaft journaled in said casing, a driven shaft journaled in said casing, a cross member keyed to said driving shaft, a pair of bevel pinions rotatably mounted in each end of said member, a bevel wheel loose on said driving shaft and gearing with said bevel pinions, a sleeve loose on said driving shaft, a second bevel wheel keyed to said sleeve and gearing with said bevel pinions, a second cross member keyed on said sleeve, a second pair of bevel pinions rotatably mounted in each end of said member, a pair of bevel wheels loose on said sleeve and gearing with said second pair of bevel pinions, a third cross member keyed to said driven shaft, a third pair of pinions rotatably mounted in each end of said third cross member, a fifth bevel wheel loose on said driven shaft and gearing with said third pair of bevel pinions, a second sleeve loose upon the driven shaft, a sixth bevel wheel keyed to said second sleeve and gearing with said third pair of bevel pinions, a fourth cross member keyed to said second sleeve, a fourth pair of bevel pinions rotatably mounted in each end of said fourth cross member, a further pair of bevel wheels loose upon said second sleeve and gearing with said fourth pair of bevel pinions gearing connecting the bevel wheels on the driving shaft with the bevel wheels on the driven shaft, and a brake operating upon one of said bevel wheels.

9. In a speed gearing, the combination of a driving shaft, a balance gear having its central member keyed to said driving shaft, a driven shaft, a balance gear having its central member keyed to said driven shaft gearing interconnecting the side members of said balance gears, and means for braking a side member of one of said balance gears.

10. In a speed gearing the combination of a casing, a driving shaft mounted rotatably in said casing, a balance gear having its central member keyed to said driving shaft, a driven shaft mounted rotatably in said casing, a balance gear having its central member keyed to said driven shaft, spur wheels fixed upon the side members of the balance gear upon said driving shaft, additional spur wheels meshing with said spur wheels and integral with the bevel wheels upon said driven shaft, and means for braking the side members of said balance gears.

11. In a speed gearing, the combination of a casing, a driving shaft mounted rotatably in said casing, a sleeve loose upon said driving shaft, a balance gear having its central member keyed to said driving shaft and one of its side members keyed to said sleeve, a second balance gear having its central member keyed to said sleeve, brake drums integral with the side members of said balance gears, spur wheels fixed upon the side members of said balance gears, a driven shaft mounted rotatably in said casing, a second sleeve loose upon said driven shaft, a third balance gear having its central member keyed to said driven shaft, and one of its side members keyed to said second sleeve, a fourth balance gear having its central member keyed to said second sleeve, spur wheels fixed upon the side members of said third balance gear and meshing with the spur wheels on said second balance gear, spur wheels fixed upon the side members of said fourth balance gear and meshing with the spur wheels on said first balance gear and braking means upon the outer surfaces of said brake drums.

12. In a speed gearing, the combination of a driving and a driven shaft, balance gearing on each of said shafts, gearing interconnecting side members of two of said balance gearings, and means for putting the balance gearings in operation so that all the gears take part in driving the driven shaft.

13. In a speed gearing, the combination of a driving and a driven shaft, a balance gearing on each of said shafts, gearing interconnecting side members of said balance gearings, and means for putting the two balance gearings in operation so that both balance gearings take part in driving the driven shaft.

14. In a speed gearing, the combination of a driving shaft, a balance gearing having one of its members keyed to said driving shaft, a driven shaft, a balance gearing having one of its members keyed to said driven shaft, gearing interconnecting the remaining members of said balance gearings, and means for braking one of said remaining members of said balance gearings.

In witness whereof I have signed my name to this specification in the presence of two subscribing witnesses.

J. A. ARMSTRONG.

Witnesses:
H. W. K. JENNINGS,
LEONARD E. HAYNES.